United States Patent
Sun et al.

(10) Patent No.: US 10,698,633 B2
(45) Date of Patent: Jun. 30, 2020

(54) SNAPSHOT SPACE REDUCTION METHOD AND APPARATUS

(71) Applicant: Arcserve (USA) LLC, Eden Prairie, MN (US)

(72) Inventors: Chuanqi Sun, Beijing (CN); Yu Lu, Beijing (CN)

(73) Assignee: ARCSERVE (USA) LLC, Eden Prairie, MN (US)

( * ) Notice: Subject to any disclaimer, the term of this patent is extended or adjusted under 35 U.S.C. 154(b) by 0 days.

(21) Appl. No.: 15/964,977

(22) Filed: Apr. 27, 2018

(65) Prior Publication Data
US 2019/0332265 A1    Oct. 31, 2019

(51) Int. Cl.
*G06F 3/06* (2006.01)

(52) U.S. Cl.
CPC .......... *G06F 3/065* (2013.01); *G06F 3/0619* (2013.01); *G06F 3/0641* (2013.01); *G06F 3/0644* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 6,594,744 B1* | 7/2003 | Humlicek | ............ | G06F 3/0601 707/999.202 |
| 7,487,310 B1* | 2/2009 | Bingham | ............ | G06F 11/1458 707/999.202 |
| 8,046,547 B1* | 10/2011 | Chatterjee | ........... | G06F 11/1461 707/649 |
| 9,171,002 B1* | 10/2015 | Mam | ........................ | G06F 3/06 |
| 2005/0027956 A1 | 2/2005 | Tormasov et al. | | |
| 2011/0202719 A1* | 8/2011 | Rossi | .................. | G06F 11/2082 711/114 |
| 2011/0219201 A1* | 9/2011 | Ranade | ............... | G06F 16/1727 711/162 |
| 2012/0060005 A1 | 3/2012 | Sudhakar | | |
| 2014/0164724 A1* | 6/2014 | Cheng | .................. | G06F 3/0604 711/162 |
| 2014/0258657 A1* | 9/2014 | Schott | .................. | G06F 3/0608 711/162 |
| 2017/0031771 A1* | 2/2017 | Binford | ................ | G06F 16/128 |
| 2017/0177867 A1* | 6/2017 | Crofton | ................. | G06F 21/566 |
| 2017/0293628 A1 | 10/2017 | Adler et al. | | |
| 2019/0073378 A1* | 3/2019 | Guturi | .................. | G06F 16/185 |

OTHER PUBLICATIONS

International Search Report and Written Opinion filed in the corresponding PCT application; 9 pages.

* cited by examiner

*Primary Examiner* — William E. Baughman
(74) *Attorney, Agent, or Firm* — Black, McCuskey, Souers & Arbaugh, LPA

(57) ABSTRACT

A system and method are presented that reduce the use of snapshot space. One embodiment of the present invention only performs snapshot copies for blocks on the source volume that have not yet been backed up. Another embodiment stores the data in the snapshot space in multiple files, and then deletes those files that contain data whose corresponding blocks have been backed up. A third embodiment stores the data in the snapshot space directly onto a dedicated device and then reuses the data blocks for data already backed up when the dedicated device is full.

18 Claims, 10 Drawing Sheets

| Key: 1 (B) | Value: 0 | 1110 |
| Key: 3 (D) | Value: 3 | 1120 |
| Key: 4 (E) | Value: 2 | 1130 |
| Key: 5 (F) | Value: 1 | 1140 |

| Key: 1 (B) | Value: 0 | 1110 |
| Key: 6 (G) | Value: 3 | 1120 |
| Key: 4 (E) | Value: 2 | 1130 |
| Key: 5 (F) | Value: 1 | 1140 |

SNAPSHOT SPACE REDUCTION METHOD AND APPARATUS

FIELD OF THE INVENTION

The present invention relates to block-level backups of computer data. In particular, the present invention relates to an improved method and apparatus for reducing the use of snapshot space in order to increase the likelihood of a successful data backup.

BACKGROUND OF THE INVENTION

Block-level backups are computer data backups that are performed at the block level, with a block being a group of disk or volume sectors. By dealing directly with data blocks on the source volume, these backup processes bypass the file system. Because each backup may take a long time to complete, block-level backups usually are accomplished using snapshot technology. Snapshots are used to "freeze" the volume or volumes being backed up at a point of time.

Snapshot technology can be implemented using a variety of methods, including Copy-on-Write (COW), Redirect-on-Write (ROW), and Split-Mirror snapshots. The present invention is primarily focused on COW snapshots, which are particularly useful when the backup process is being performed by independent backup software. The COW snapshot technology, which doesn't change the production data flow, is used in this type of process to reduce the impact of the backup on the production machine being backed up. In this case, the snapshot is created at the beginning of the backup process and deleted at the end of the backup.

The traditional process of COW snapshots is shown in connection with FIGS. 1, 2, and 3. The goal of the backup software is to create a copy of the volume as it exists at a particular moment in time. FIG. 1 shows the content of a volume 100. To simplify the explanations involved, this volume 100 presented as having only 8 blocks of possible data. As shown in FIG. 1, each of these eight blocks are assigned a sequence number, and blocks 0, 1, 2, 3, 4, 5, and 6 contain data A, B, C, D, E, F, and G, respectively. Block 7 contains no data.

Backup software tasked with backing up this volume 100, which means that the data within volume 100 (namely A, B, C, D, E, F and G) must be copied to a backup location. This backup process may take a significant amount of time, and during this time a production machine may need to overwrite the data on volume 100. To ensure that the backup software is working on the data as it existed at that time the backup process started, the COW process effectively takes a "snapshot" of the state of the data in volume 100 at the beginning of the process. This snapshot representation of the state of volume 100 is indicated by figure numeral 110. By taking this snapshot 110, the backup process will be able to back up the data on the volume 100 as it existed at the moment the snapshot 110 was created.

The COW process creates this snapshot 110 using a snapshot driver 200 that monitors data being written to the volume 100 during the backup process, as is shown in FIG. 2. When a write request arrives at the volume 100 during the backup, the snapshot driver 200 will intercept the write request and will determine whether the destination blocks for that write already contain data (as is the case with blocks 0-6 of volume 100). If they do, writing the data found in the write request will interfere with the ability to back up the data unless the snapshot driver 200 intervenes. In this case, the COW process implemented by the driver 200 will copy the original data of the intended destination for the write request to a snapshot space 220 before those locations are overwritten. In FIG. 2, blocks 1, 3, 4, 5, and 7 are being written to during the backup. For blocks 1, 3, 4, and 5, the snapshot driver 200 needs to copy the original data B, D, E and F to the snapshot space before writing the new data (B', D', E', and F') to the corresponding blocks on volume 100. In FIG. 2, the new data for the blocks are shown arriving in a certain order, with block 1 (B') arriving first (it appears highest in FIG. 2), block 7 (H) next, and then blocks 5 (F') and 4 (E'), and finally block 3 (D'). Because of this order, the blocks in the snapshot space 220 are ordered B, F, E, and then D. As for block 7 (H), this data will be written to the volume directly without any copying to the snapshot space 220 because the block 7 had not contained any data at the time the snapshot 110 was created.

From the point of view of backup process 300 as shown in FIG. 3, the process will back up the allocated blocks 0, 1, 2, 3, 4, 5 and 6 sequentially from the snapshot 110 taken of volume 100. The snapshot process understands that data A, C, G of blocks 0, 2, 6 can be read directly from the real volume 100, but the data B, D, E, F of blocks 1, 3, 4, 5 will need to be read from the snapshot space 220 because of the COW snapshot process (as shown by redirection lines 310).

For this to work, all the data found in blocks that are updated during the backup process (blocks 1, 3, 4, and 5) are copied to the snapshot space 220. One crucial question that must be addressed in this situation is how much snapshot space 220 must be allocated for the backup process for the COW data to maintain the snapshot 110. Generally, the recommendation is that the snapshot space 220 be approximately 10 percent of the data that is being protected (volume 100). But if the load on the protected system is very high, or the backup process is slowed, the required snapshot space 220 may be quite a bit larger. If the allocated snapshot space 220 is in sufficient, the backup processes will fail.

SUMMARY OF THE INVENTION

The present invention provides an apparatus and methods to reduce the use of snapshot space. The increased efficiency in using this space 220 increases the possibility of backup success even for a high load system as the present invention reduces the likelihood of a backup error caused by insufficient snapshot space 220.

One embodiment of the present invention only performs snapshot copies for blocks on the source volume that have not yet been backed up. Because some data is not copied under the COW process to the snapshot space, the use of and system load required by performing those copies is reduced.

Another embodiment stores the data in the snapshot space in separate files in a file system. This embodiment splits the COW cache file into multiple files, and then deletes those files that contain data whose corresponding blocks have been backed up. This released space can be used to cache more COW data for the blocks that have not been backed up.

A third embodiment stores the data in the snapshot space directly onto a dedicated device without use of a file system. The embodiment then reuses the COW space of data blocks that have been backed up when the dedicated device is full.

BRIEF DESCRIPTION OF THE DRAWINGS

FIG. 11 is a schematic view of the content of a search tree used to maintain the content of the snapshot space shown in FIG. 10.

FIG. 12 is a schematic view of the content of the search tree of FIG. 11 after updating.

DETAILED DESCRIPTION

Handling Writes to Already Backed Up Blocks

Figure 1:
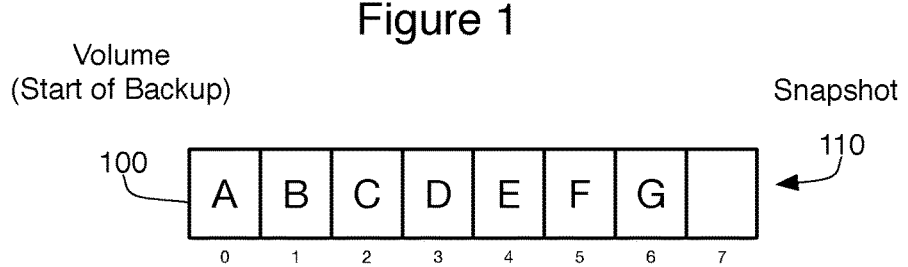
FIG. 1 is a schematic view of the content of a storage volume.
Figure 3:
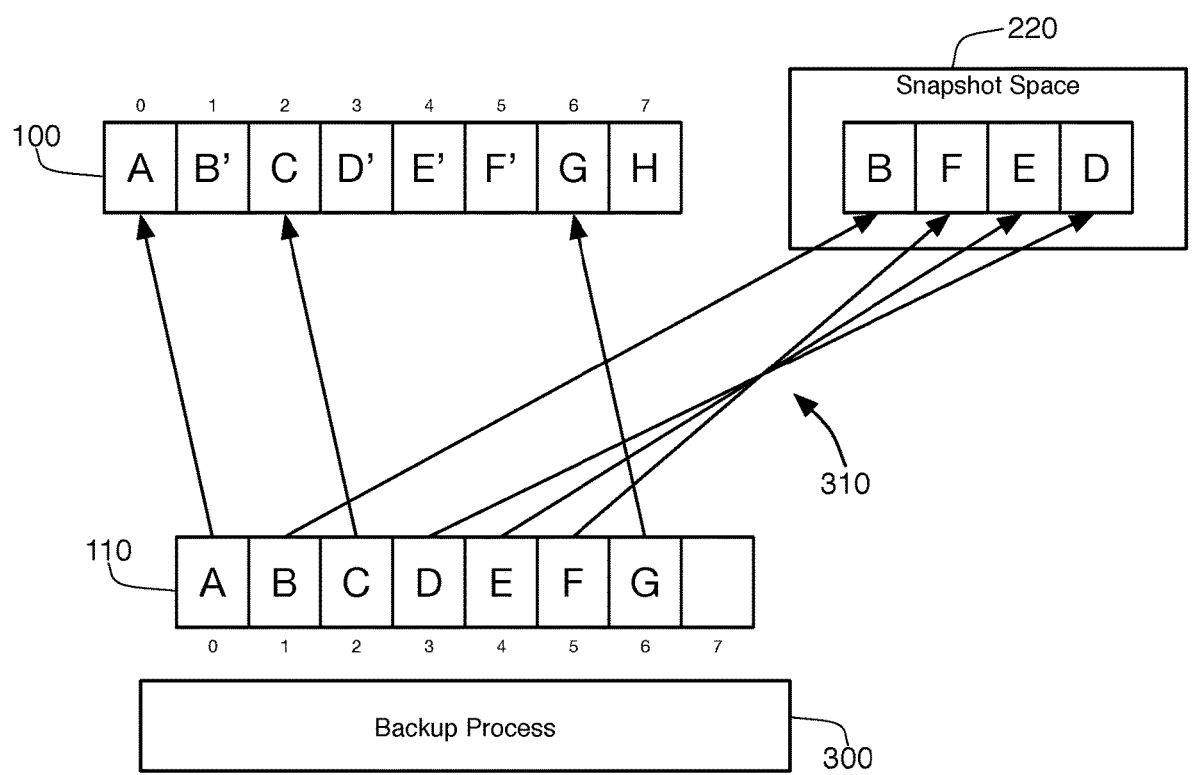
FIG. 3 is a schematic view of a snapshot space being used to provide data during a backup.
Figure 4:
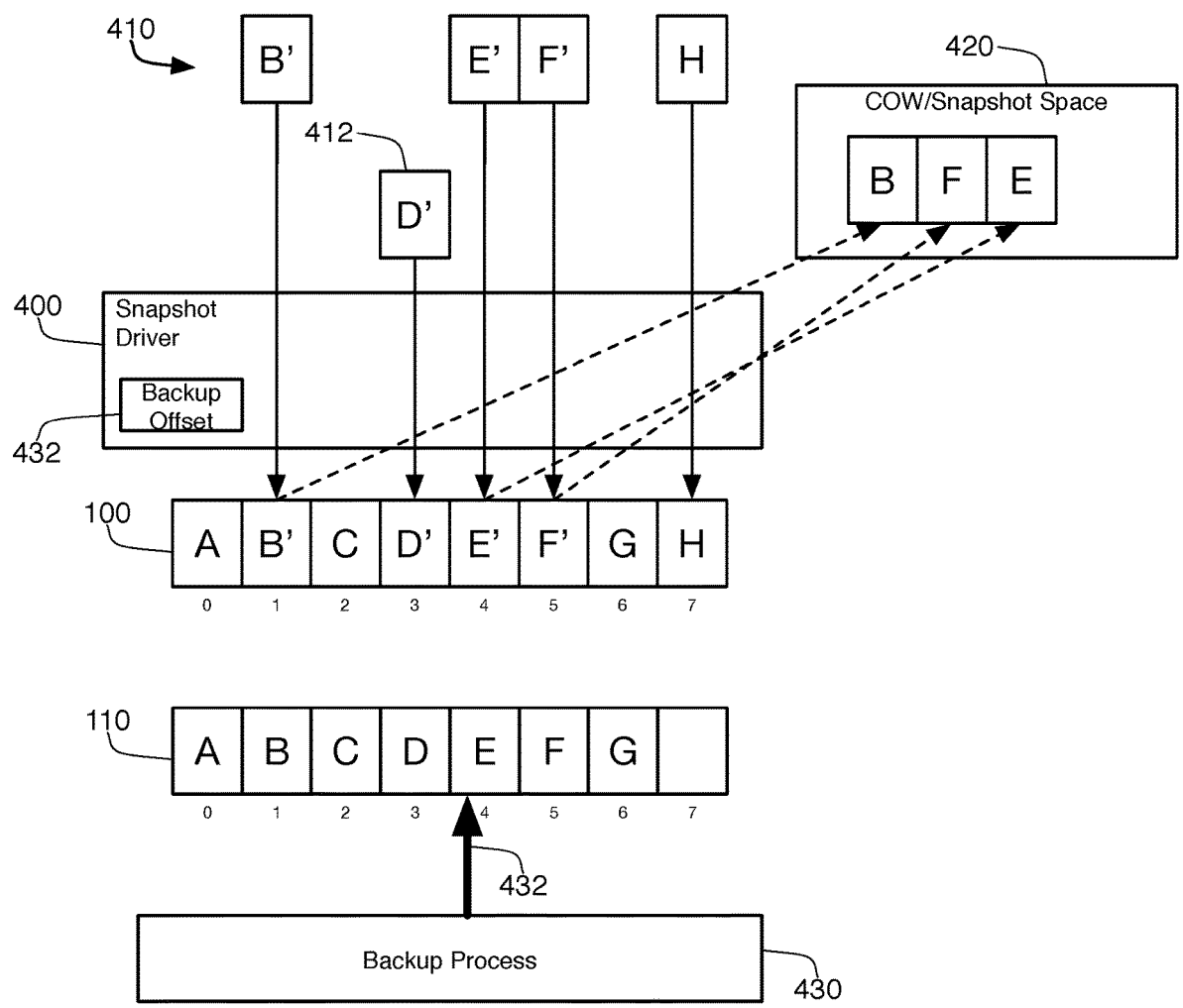
FIG. 4 is a schematic view of one embodiment of the present invention showing a system and method for using snapshot space.

FIG. 4 shows one aspect of the present invention. In this case, a snapshot is established 110 that is the same as the snapshot 110 shown in FIGS. 1 through 3. A snapshot driver 400 that implements this aspect of the present invention monitors all activity writing to the volume 100 being backed up. In this case, four writes 410, to four different blocks, have already been received and handled by the snapshot driver 400 in a manner consistent to the handling provided driver 200 described above. In particular, data B' has been written to block 1, with data B being copied to the snapshot space 420. Similarly, block 5 was written to next, with data F being copied to the snapshot space 420 before being overwritten with data F', and then data E' for block 4 was received and handled. As before, data H for block 7 was written directly to the volume 100 without needing to copy data to snapshot space 420.

In this embodiment, it is important that the blocks represented by the snapshot 110 of volume 100 be backed up by the backup process 430 sequentially. In other words, block 0 (data A) is backed up first by the backup process 430, then block 1, and so on. The backup process 430 keeps track of a current backup offset 432, which represents the spot in the snapshot 110 that is currently being backed up by process 430. After each block is backed up (or, preferably, after a number of consecutive blocks are backed up), the backup process 430 communicates the current position of the backup offset 432 to the snapshot driver 400. In this manner, the snapshot driver 400 is made aware of how far the backup process 430 has progressed in backing up the data represented by snapshot 110.

Figure 5:
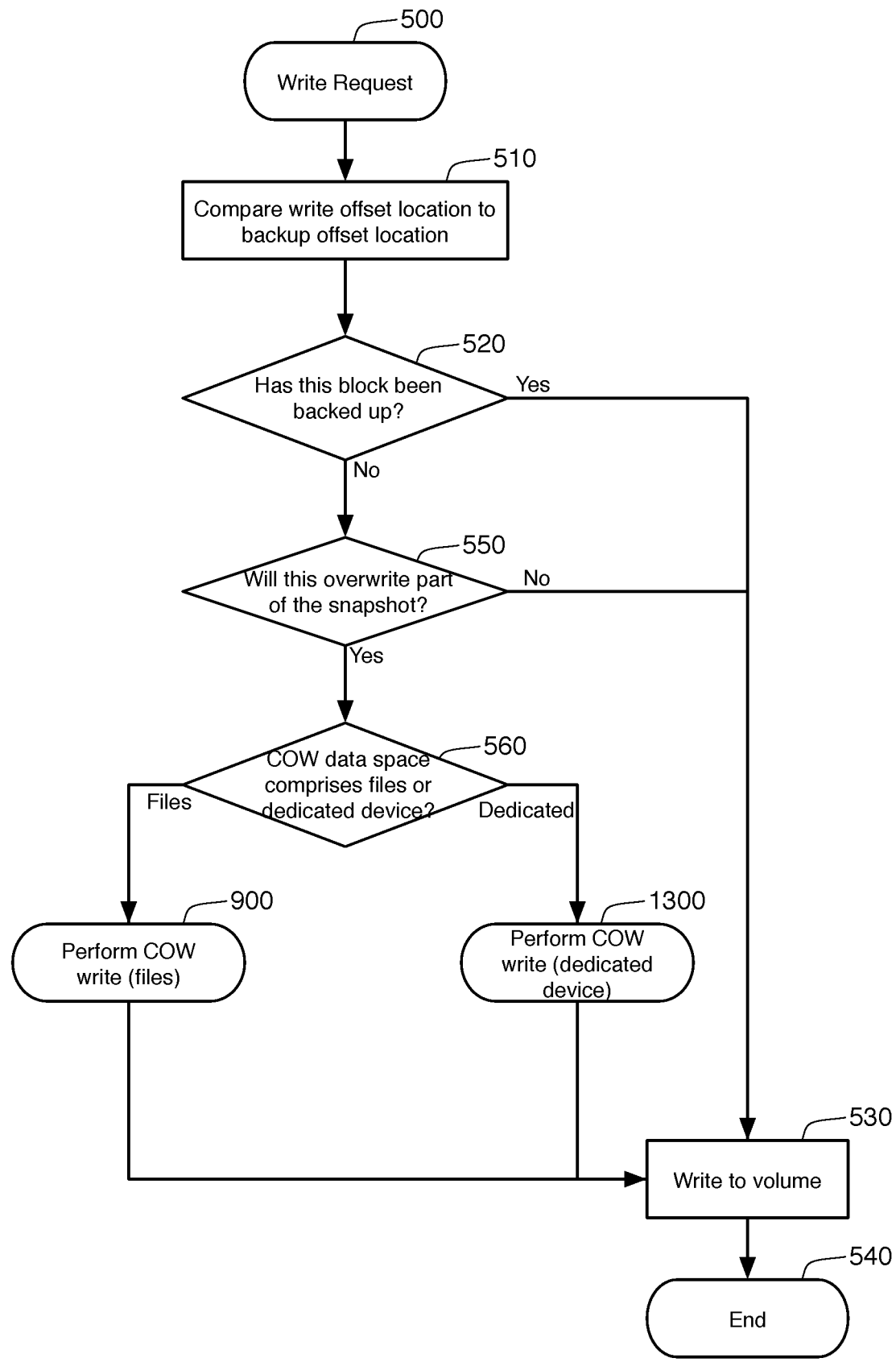
FIG. 5 is a flowchart showing a method that may be used with the system of FIG. 4.

The method 500 shown in FIG. 5 is undertaken when the snapshot driver 400 intercepts a write request. The first step 510 in method 500 is for the driver 400 to check whether the current write offset (the location of the blocks being written to by the incoming write data) is less than the current backup offset 432. In most cases, this takes the form of a simple, mathematical comparison between the write block offset and the stored copy of the backup offset 432. The purpose of the comparison is to determine whether the destination block for the write request has already been backed up by the backup process 430 (step 520). If yes, the snapshot driver 400 does not need to perform the copy-on-write (COW) backup for the destination blocks, but instead simply writes the data directly to the volume in step 530. The process 500 for handling this write request 500 then ends at step 540.

These steps are best understood in the context of FIG. 4. The current write request 412 is requesting that the data D' be written to block 3 on volume 100. Blocks 1, 4 and 5 have been previously overwritten with new data, and the driver 400 performed the COW process to copy those data blocks to the snapshot space 420. Block 7 was not copied to the snapshot space 420 because it's a new write. According to the current backup offset 432, the backup process 430 is currently backing up data E from block 4. Because the backup process 430 operates sequentially, we know that blocks 0, 1, 2 and 3 have been backed up. Assuming that the backup process 430 has communicated the current state of the backup offset 432 to the snapshot driver 400, this fact will be known to the snapshot driver 400. In the preferred embodiment, the offset 432 is not the block currently being backed up (i.e., it is not the number 4), but rather the current block number times the size of each block. In other words, the offset is not a number of blocks, but an actual amount of data (such as in bytes). To simplify the discussion, the backup offset 432 and other offsets described herein may be indicated in blocks as opposed to bytes.

Figure 2:
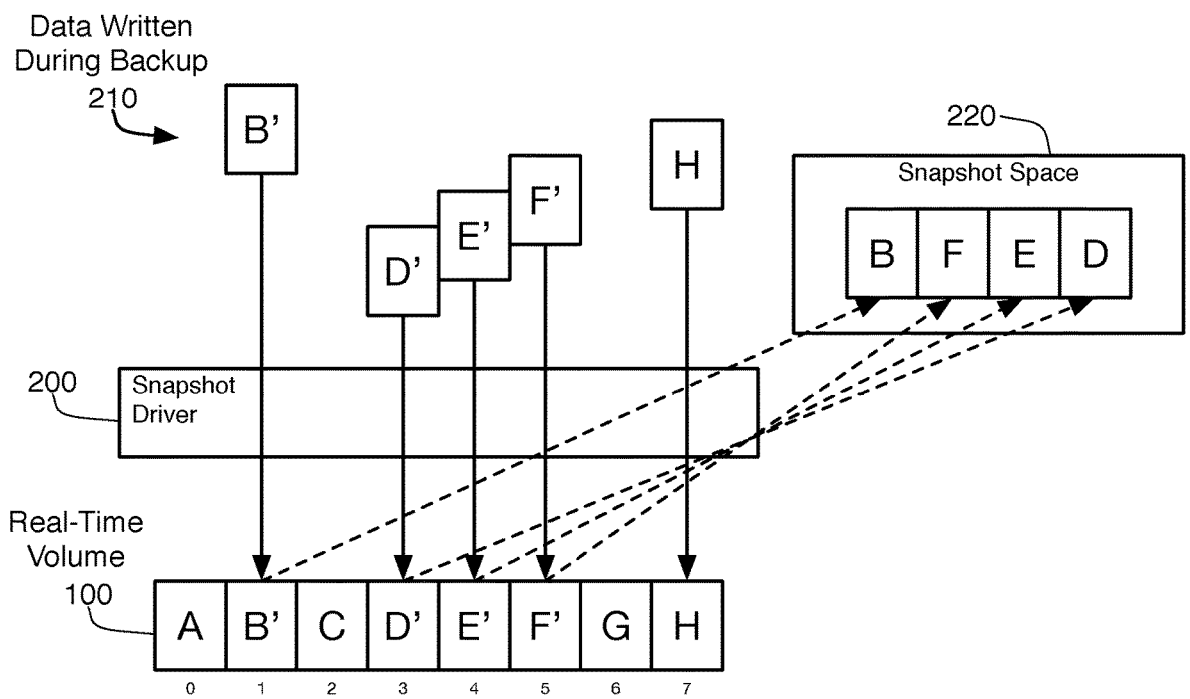
FIG. 2 is a schematic view of a snapshot driver of the prior art maintaining a snapshot space.

In prior art systems, such as those described in connection with FIGS. 2 and 3, the COW process receiving write request 412 would simply copy the data to be overwritten at block 3 (namely data D) to the snapshot space 420. The improved driver 400 realizes, however, that there is no need to make the whole snapshot 110 available to the backup process 430 for the entire duration of the backup. Since the backup offset 432 is already on to block 4, the backup process 430 has already handled the backup of data D at block 3. As a result, step 520 determines that the destination block has already been backed up, and the data D' will be written directly to block 3 of volume 100 at step 530.

From the point of view of the backup process 430, it is irrelevant that the value for block 3 from the snapshot 110 is no longer obtainable from either the volume 100 or the snapshot space 420 because the backup of block 3 is completed. In this manner, the overall system can save space in the snapshot space 420 by ignoring the COW process for any blocks that have already been backed up. Because less space is being used in the snapshot space 420, the odds of that space 420 filling and the backup process 430 terminating in error is greatly reduced. In addition, the method 500 can lighten the system load of the production machine, since less data is required to be copied by the driver 400 to the snapshot space 420. The advantages become more obvious during the second half of the backup process 430 because more and more of the COW operations can be ignored.

Returning to FIG. 5, write request 412 will be written directly to the volume 100 as determined by steps 520 and 530. If, however, step 520 did not find that the data to be overwritten by the write request is already backed up, step 550 will determine whether the COW process must be performed to protect the data of the snapshot 110. There are two circumstances where there is no danger to the snapshot 110, and therefore COW copying can be skipped. The first is where the data in the write request is being written to a block that does not form part of the snapshot 110. For instance, data "H" was destined for block 7, and block 7 in volume 100 was not part of the snapshot 110. As a result, step 550 will determine that this type of data can be written directly to the volume 110 in step 530. The other circumstance is where the block being written to has already been copied to the COW snapshot space 420. For instance, data E" for block 4 might be received after E' had already been written to block 4. Since the original data of block 4 (E) has already been copied to the snapshot space 420, there is no need for further COW processing for data E", and block 550 will determine that the data can be written directly to the volume 100 at step 530.

If COW processing is required, the present invention describes two different methods for performing this process. The selection between these methods occurs at step 560, and is based upon whether the snapshot space 420 is located on a file system (such as within a folder on that file system), or whether the snapshot space 420 is located on a dedicated device (in which case the COW data can be stored directly as blocks on the device). This determination 560 determines whether method 900 or method 1300 is performed to accomplish the actual COW copying to the snapshot space 420. These methods 900, 1300 are described in more detail below. Of course, in an actual implementation, both methods 900, 1300 need not be present. If a single one of the methods 900, 1300 is used, there would be no need for a determining step 560 to choose between those methods 900, 1300. In still further embodiments, neither method 900, 1300 might be used, and only standard COW processing of the prior art (described in connection with FIGS. 2 and 3 above) is used to complete the method 500. Regardless of which method is used to perform the COW copying of the data to the snapshot location, the process 500 continues afterwards with the writing of the requested data to the volume 100 at step 530. The process then ends at step 540.

Use of the Search Tree

Figure 6:
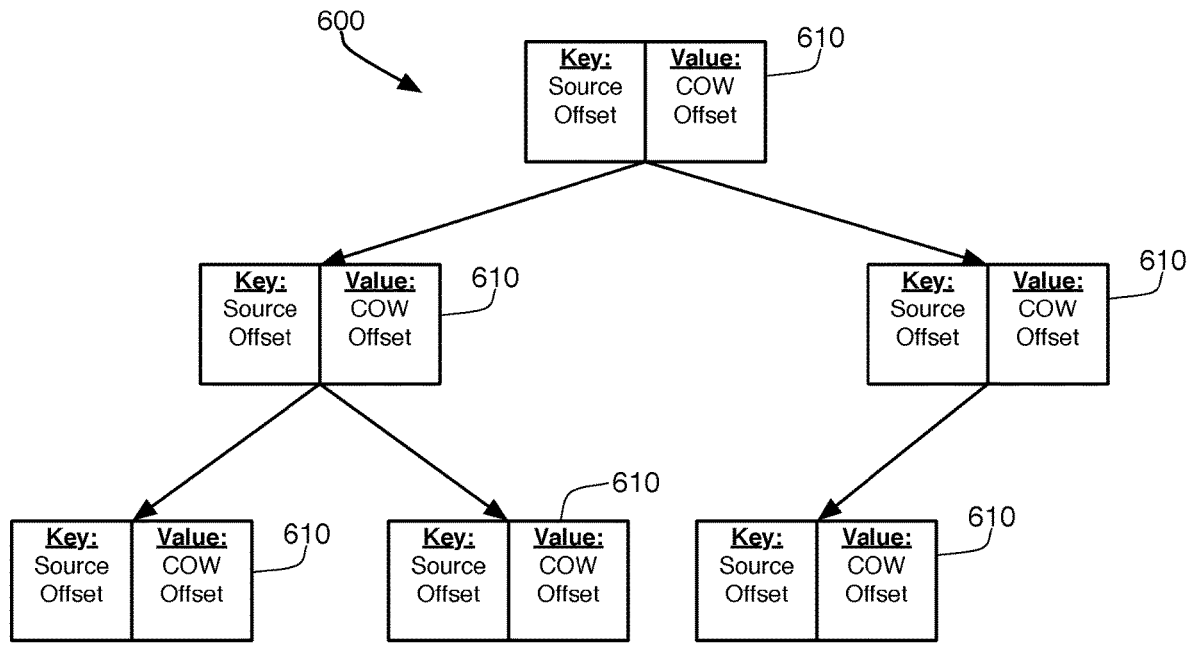
FIG. 6 is a schematic view of a search tree used to maintain the content of a snapshot space.

Method 500 reduces the use burden on the snapshot space 420 by reducing the number of blocks that are copied to that space 420. It is also possible to avoid snapshot space overload errors by reusing that space 420 when the data it contains is no longer necessary. The two techniques described herein for such reuse both rely upon a search tree to manage the information contained in the snapshot space 420. While the search tree can take many forms, efficiency can be maximized by using a self-balancing tree such as an AVL tree that is maintained in memory during the backup process 430. FIG. 6 provides a schematic view of this type of search tree 600.

In FIG. 6, the tree 600 is made of a plurality of key/value pairs 610 that constitute the leaves or nodes of the tree 600. In one embodiment, each node 610 consists of an 8-byte key and an 8-byte value. The key indicates the source volume offset where the COW block in the snapshot space 420 originated. This can be calculated by multiplying the block_sequence_number of the block in the volume 100 times the block_size. The value of the key/value pair indicates the offset in the snapshot space 420 where that COW block is stored.

Figure 7:
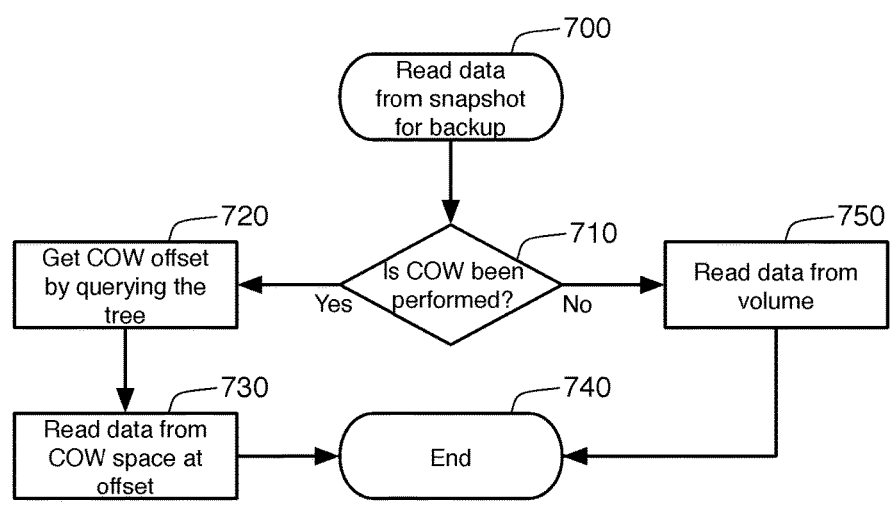
FIG. 7 is a flowchart showing a method for using the search tree of FIG. 6 to read data from a snapshot.

This type of tree 600 makes it simple for the backup process 430 to read the data from the snapshot space 420 during backup by simply consulting this tree 600, such as by using method 700 as shown in FIG. 7. A bitmap is maintained by the driver to identify blocks that have already been copied using the COW process and therefore need to be read from the snapshot space 420. This bitmap is consulted in step 710 as the first step in reading the data. When the bitmap indicates that the data is in the snapshot space 420, the process will query the tree to find the offset location of the COW block within the snapshot space 420. Because this is a self-balancing tree 600, querying a particular key (the offset location of the desired block of the snapshot 110) in the tree is accomplished through a simple and efficient query of the search tree 600. When the desired source offset position is found in the tree, step 720 reads the value from the found key/value pair 610 to determine the offset position for that COW block in the snapshot space 420. Once determined, the snapshot space 420 is read at that offset at step 730, and the process ends at 740. If the block data has not been performed COW, the data is read directly from the volume 100 in step 750, and then the process ends 740.

Reusing Snapshot Space—File System Embodiment

Figure 8:
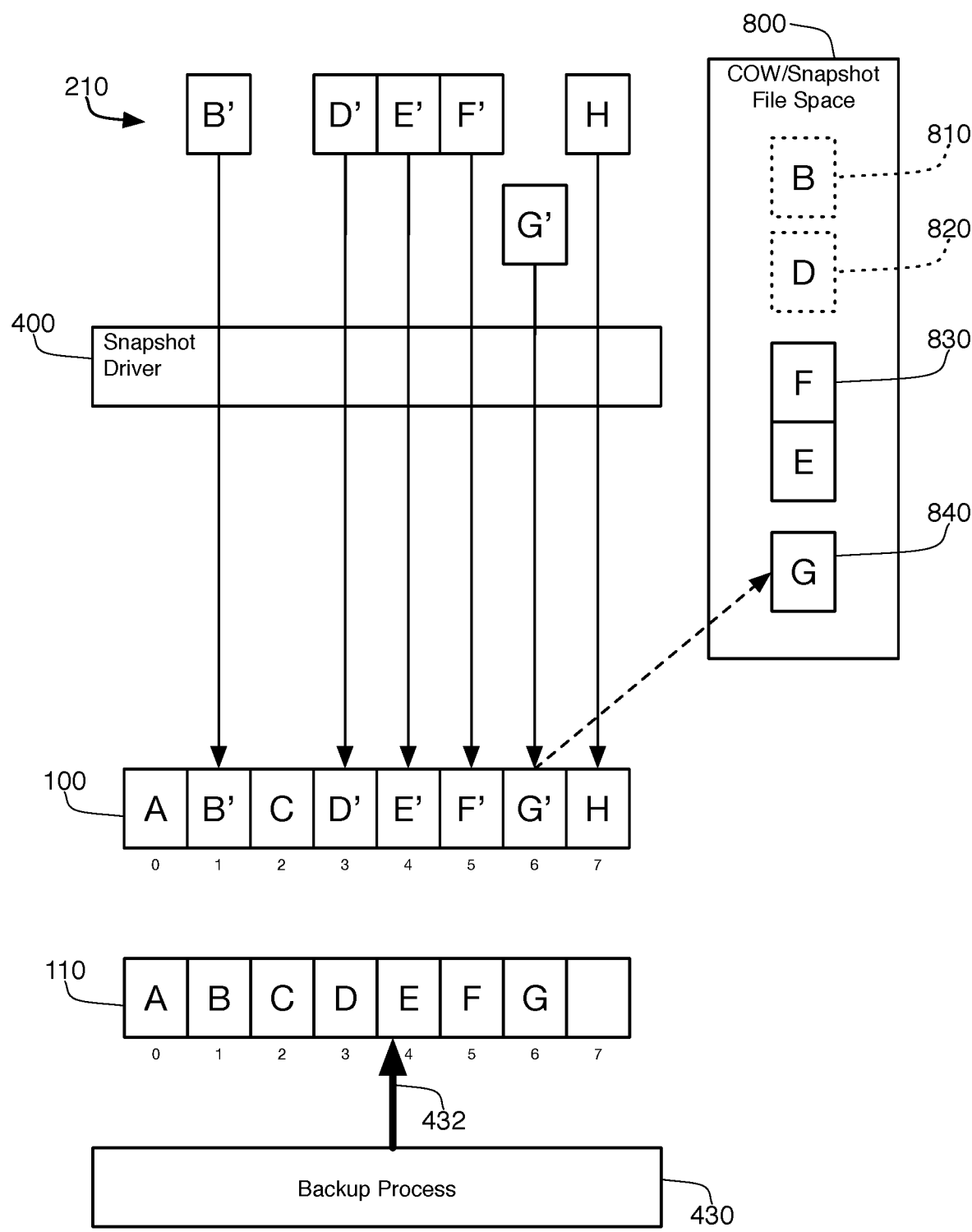
FIG. 8 is a schematic view of a second embodiment of the present invention showing a system and method for using snapshot space.
Figure 9:
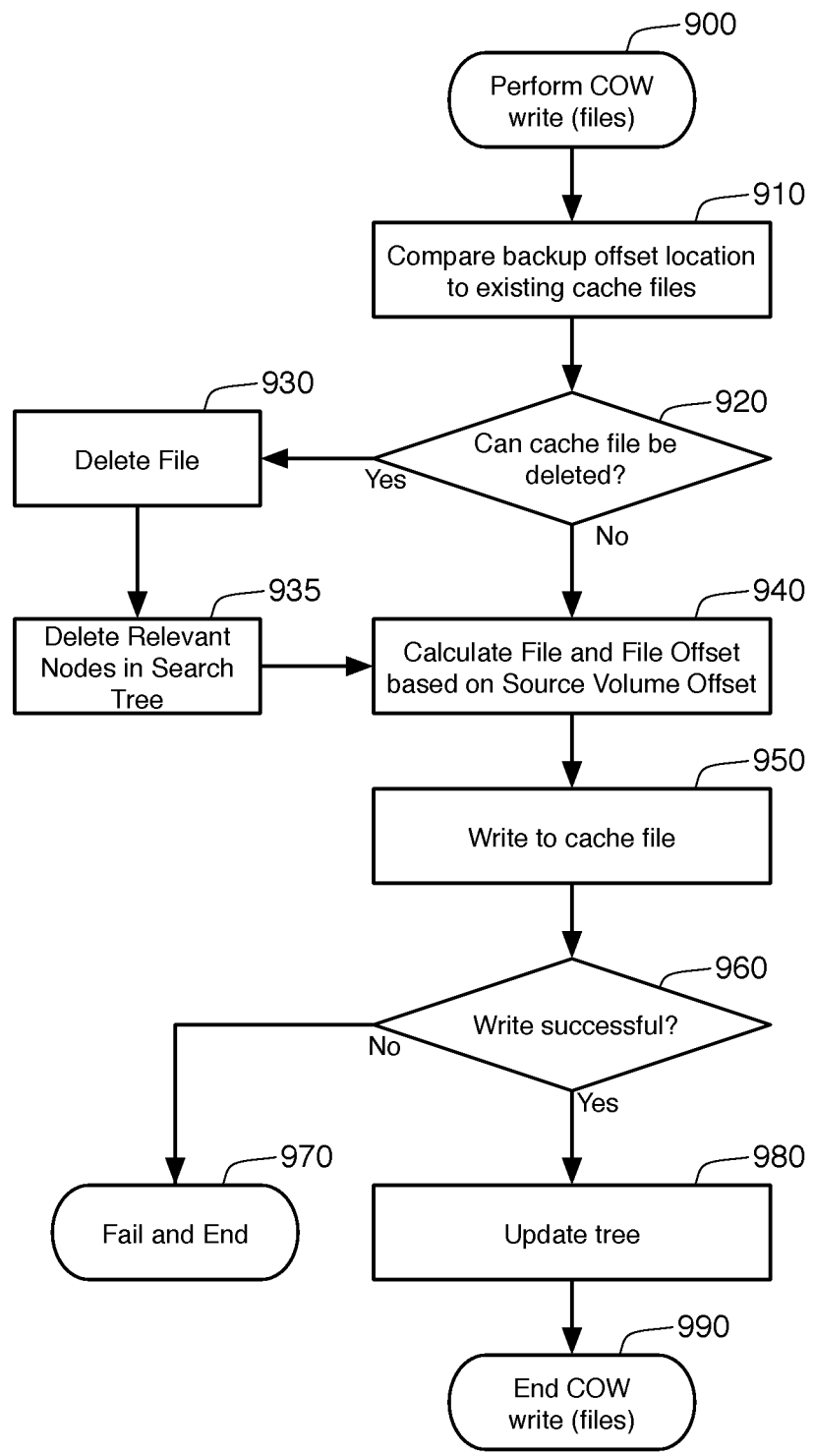
FIG. 9 is a flowchart showing a method that may be used with the system of FIG. 8.

FIGS. 8 and 9 show the details of a method 900 that stores COW data in the snapshot 800 inside one or more regular files in a file space. If a single file is used to store the COW data, the COW data will simply be appended to the file continuously during the backup. In this case, the COW cache file will keep growing as more blocks are copied by the snapshot driver's COW process. This file will quickly become very large, especially when the backup process 430 is slow, the volume 100 has mass of data, or the system load is high. As described above, a backup process 430 will fail once no space can be used to append the data to the COW cache file, which becomes more likely as the file size grows.

As a result of this problem, the embodiment of FIGS. 8 and 9 splits the COW cache into multiple files in the snapshot file space 800. This means the COW data for different blocks will be written different cache files, such as files 810, 820, 830, and 840 shown in FIG. 8. Once the data is split into separate files, it is possible to separately manage these files, and even delete the files once they are no longer needed. It is, however, important to establish a fixed correlation between the blocks of the source volume 100 and the different files 810-840 found in the snapshot file space 800.

In one embodiment, this correlation is established through simple mathematics. For this determination, the letter J represents the maximum number of COW cache files desired the volume 100, K represents the number of blocks on volume 100, and L represents the number of blocks maintained within each COW cache file 810-840. L, the number of blocks per file, can be calculated by the following formula: L=ROUNDUP(K/J, 0). In the context of FIG. 8, J is set to 4, which means that the snapshot file space 800 will dedicate no more than 4 COW files for the snapshot. This means that L=ROUNDUP(8/4, 0), or 2, which means that each COW cache file 810-840 will maintain two blocks of the volume 100.

In order to determine which file contains (or should contain) a particular block of volume 100, another simple formula is consulted. This correlation or assignment to a particular COW data file is based on the offset or sequence number of the source block. More particularly, in this correlation or assignment, M represents the sequence number of the COW file (ranging from 1 to J), and N is the sequence number or offset of the block found on volume 100. The assignment criteria for M then becomes: M=N/L+1. This means the following:

1) COW data of block 0 and 1 (data A and B)→COW File 1

2) COW data of block 2 and 3 (data C and D)→COW File 2

3) COW data of block 4 and 5 (data E and F)→COW File 3

4) COW data of block 6 and 7 (data G)→COW File 4

As mentioned before, the allocated blocks of a volume 100 are backed up sequentially in these embodiments. This allows method 900 to selectively prune the COW files 810, 820, 830, and 840 when they are no longer needed. It must be remembered that method 900 forms a portion of method 500, shown in FIG. 5, and is only called only when COW processing is actually required. In other words, the method 900 is performed only when the snapshot driver 400 has already determined that the data to be written to the volume will overwrite data found in the snapshot 110.

The first step 910 is to compare the backup offset location 432 to the files 810, 820, 830, and 840 found in the snapshot space. Based on this comparison, step 920 then determines whether any of these files 810, 820, 830, or 840 can be deleted. By dividing the sequence number of backup offset location 432 by L (the number of blocks per file), and then adding one, the lowest sequence number of still-relevant COW files can be determined. In FIG. 8, the backup offset location 423 is on block 4. Applying the formula, (4/2)+1 indicates that the lowest, still-relevant COW file is sequence number 3. This means that the COW files with lower sequence numbers (COW files 1 and 2) contain data that has already been backed up by the backup process 430 and are no longer needed. Hypothetically, all four of the possible COW files of FIG. 8 may be populated and relevant when backing up blocks 0 and 1 of the snapshot 110. When the backup offset moves to block 2 or 3, COW cache file 1 is no longer needed, and when the backup offset is at block 4 or 5, COW cache file 2 is then not needed. In these circumstances, step 930 will delete any of the COW files 810-840 that are no longer needed. When the backup offset location 423 is on block 4, as shown in FIG. 8, the first COW file 810 and the second COW file 820 can be deleted, which is why they are shown in dotted outlines in FIG. 8. By deleting these files 810, 820, more room is available in snapshot space 800, which the third and fourth COW files 830, 840 can use them to store more COW data. This will reduce the likelihood that the backup process 430 will fail due to full snapshot storage 800.

After the actual files 810, 820 are deleted from the snapshot file space 800, step 935 removes the entries for these COW files 810, 820 from the search tree 900. Because each COW file 810, 820 will include multiple blocks, multiple nodes of the search tree 600 must also be deleted. In particular, all nodes whose 8-byte key is less than (L—the number of blocks per file)*(the file sequence number that was deleted)*(block_size) can be deleted. In FIG. 8, the nodes of binary search tree 600 whose key is less than 2*2*(block_size) can be deleted from the AVL tree 600 when the second COW file 820 is deleted. This will automatically include all nodes 610 pointing to the first COW file 810, as they will have keys that are less than the nodes 610 pointing to the second COW file 820. The reduction in nodes 610 in the search tree 600 will increase the efficiency and query performance of that tree 600.

After these nodes 610 are deleted in step 935, or after step 920 determines that no files need to be deleted, step 940 determines where the data from the source file 100 will be stored in the snapshot file space 800. In particular, step 940 determines both the COW file 810-840 and the offset within that file for the data. This is accomplished using the formula M=N/L+1 explained above, with the file sequence number being the whole number in M, and the offset being the remainder. At step 950, the method 900 writes to that offset location within that COW file 830 or 840. If necessary, step 950 will create the file in the snapshot file space 800 if that file does not yet exist. Note that this same method of determining file name and offset can be used in reverse in step 720 of method 700. The search tree 600 can store only the COW offset in the value of each node 610, and the appropriate file name (sequence number) and offset can then be calculated.

Step 960 determines whether or not the write is successful. The most relevant example of an unsuccessful write would be if the snapshot file space 800 were to become full. If this failure (or any other write failure) is detected, then the backup process 430 cannot go forward as it is not possible to maintain the snapshot 110 and complete the write request at step 540. The backup process would therefore end in failure at step 970. Assuming that the write to the COW file space 800 was successful, the search tree 600 is updated in step 980 to note that this data is now found in the snapshot file space 800. This sub-process then terminates at step 990, returning to method 500 to write the data to the volume at step 530.

Reusing Snapshot Space—Dedicated Device Embodiment

Sub-method 900 performs COW copying of data in the snapshot for situations where the snapshot data is maintained in a file space 800. Sub-method 1300 performs a similar method, except where the snapshot data is maintained on a dedicated device 1000, as shown in FIGS. 10-13.

Figure 10:
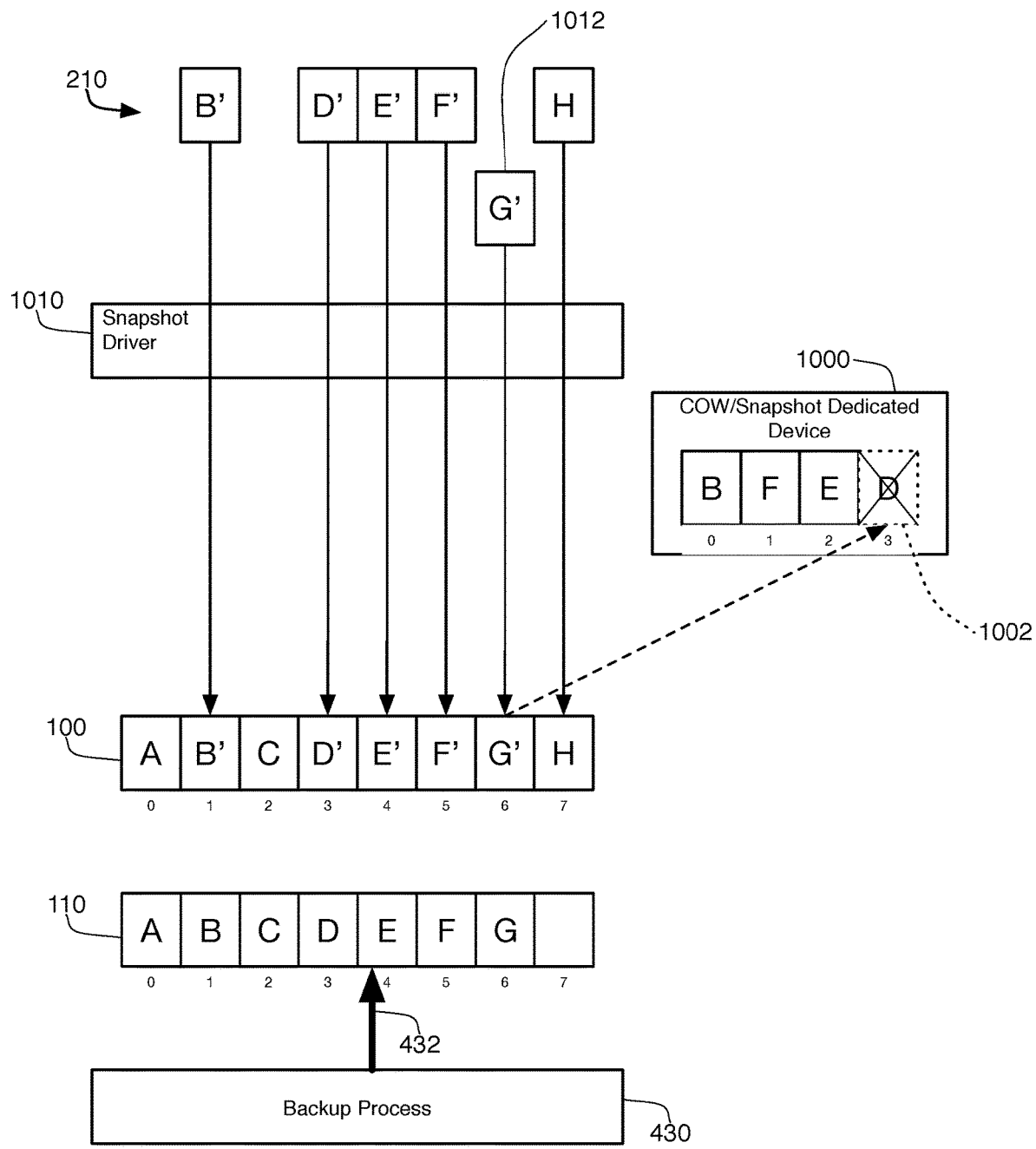
FIG. 10 is a schematic view of a third embodiment of the present invention showing a system and method for using snapshot space.
Figure 13:
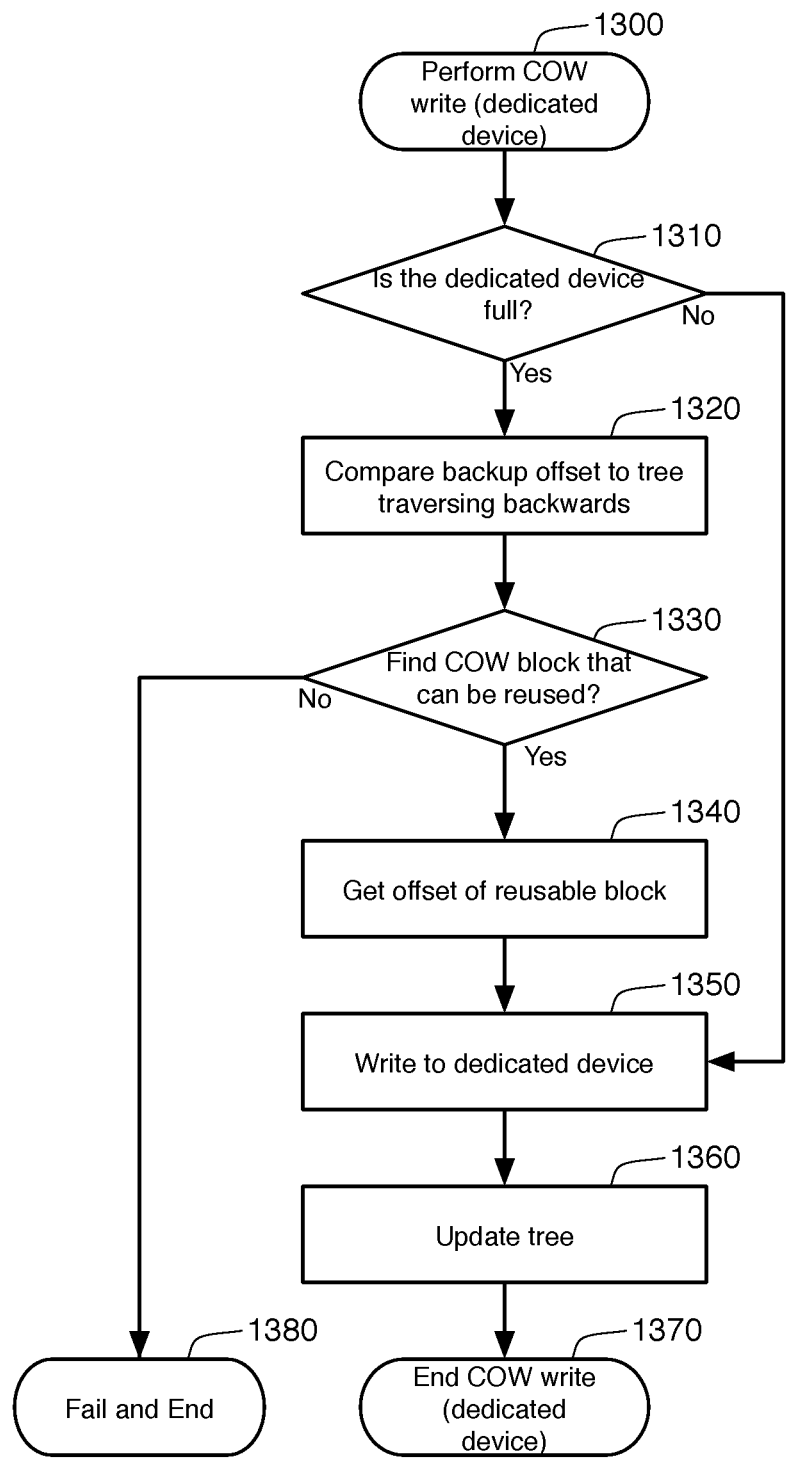
FIG. 13 is a flowchart showing a method that may be used with the system of FIG. 10.

As shown in particular in FIG. 10, a dedicated device 1000, such as a partition of a device or a separate physical device altogether, is used to store the COW data. Because there is no file system managing this snapshot location 1000, the COW data can be written to the device 1000 directly to a specified offset during the backup. For the purpose of explaining this embodiment, the dedicated device 1000 will be described as containing only four blocks of data at offsets 0-3. At the time shown in FIG. 10, five blocks of data have already been handled by the snapshot driver 1010. In particular, data B' was received and stored at block 1 of the source volume 100. To maintain the snapshot 110, the driver 1010 stored the original data B on the snapshot dedicated device 1000 at offset 0. Similarly, data element F' was stored at block 5, data E' was stored at block 4, and D' was stored at block 3. Each of these data elements was stored, in turn, on the snapshot dedicated device 1000. Data element H was also received by the driver 1010, and this was stored directly on the volume 100 without any COW copying, as is described above.

At the time of this figure, the backup process 430 is backing up block 4 of the snapshot 110, as indicated by the backup offset 432. At the same time, the snapshot driver has received a request 1012 to write data G' to block 6 of the source volume 100. In prior art systems, the backup job 430 will fail in this circumstance because COW copying of block 6 is required for this write to be performed, and this is no more space to store the COW data on snapshot dedicated device 1000. This embodiment prevents this failure through process 1300 as shown on FIG. 13.

The first step 1310 of this process 1300 is to determine whether or not the snapshot dedicated device 1000 is currently full. More specifically, this step 1300 determines fullness by determining whether the snapshot dedicated device 1000 contains enough empty/open space to contain all of the data that will need to be written to perform this COW copy. If the device has sufficient open space, then all that is necessary is to write the data to be copied to the open/empty area of the device 1000 at step 1350. The search tree 600 is then updated at step 1360 to reflect this fact, and the method ends at step 1370.

If the device 1000 does not contain sufficient space, the method 1300 will determine whether or not any space on the device 1000 can be reused. The method 1300 knows that data found on the snapshot 1000 that has already been backed up by backup process 430 is no longer needed. To find such data, step 1320 compares the backup offset 432 to that data found in the search tree 600. Since the current backup offset is on block 4, step 1320 will query the search tree 600 to find a node whose key is less than the current block position of the backup offset 432 times the block size (4*block_size). The search will look backwards from this value so as to find the largest block offset that both has data in the snapshot location 1000 and has already been backed up by process 430.

The contents of an example search tree 1100 for dedicated device 1000 is shown in FIG. 11. This search tree 1100 has four nodes, indicating that there are currently four blocks from the snapshot 110 whose data is found in the snapshot dedicated device 1000. The keys for these nodes 1110, 1120, 1130, and 1140 indicate that these blocks are blocks 1, 3, 4, and 5. Note that these values, in actual practice, will likely represent the block numbers*block_size, but have been simplified in this example. The values for each of these nodes 1100-1140 provide the offset on the dedicated device 1000 where this data can be found. For example, the data for block 1 (data B) can be found at offset 0, and the data for block 3 (data D) can be found at offset 3. Step 1320 will search for keys that occur before block 4 in the snapshot 110, searching backwards from block 4. Therefore, step 1320 will identify node 1120, representing block 3 and data D from the snapshot 110 (and not, for instance, node 1110). This identified node 1120 represents a block on the device 1000 that can be reused.

Step 1330 determines if a reusable block has been found. In the examples of FIGS. 10 and 11, such a block was identified at node 1120 of the search tree 1100. As a result, step 1340 will then examine the value for this node 1120 to determine the offset value of the reusable block (namely offset 3 on dedicated device 1000). This offset location is indicated by figure numeral 1002 in FIG. 10. The data to be copied by the COW process (G) is then written to this offset location 1002 in step 1350, and then the search tree 1100 is updated at step 1360 to represent the new data on the snapshot dedicated device 1000. In one embodiment, the search tree 1100 is updated by simply updating the key of node 1120 with the offset of the new block—in this case block 6 of the snapshot (or, in practice, 6*block_size). The value of this node 1120, which indicates the offset location in the snapshot 1000, remains unchanged. This indicate that offset 3 of the snapshot dedicated device 1000 (indicated by the value of node 1120) now contains value G, which is offset 6 of the snapshot 110 (based on the key of node 1120). This revised tree 1200 is shown in FIG. 12. Note that the orders of steps 1350 (writing to the dedicated device 1000) and step 1360 (updating the search tree) can be reversed in some embodiments.

Of course, in some circumstances step 1330 will not find any space that can be reclaimed in COW dedicated storage 1000. In this case, it is not possible to perform the COW action and the backup process 430 must fail and end at step 1380. However, even if backup process 430 will fail at step 1380 in some instances, method 1300 will increase the possibility of completing backup when the dedicated device 1000 becomes full.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for performing copy-on-write snapshot management during a block-level backup of a source volume comprising:
   establishing a snapshot of data found on the source volume;
   sequentially performing the block-level backup of the snapshot of the source volume while maintaining a backup offset location identifying a location in the snapshot currently being backed up;
   receiving a first write request to write a first data element to the source volume at a first offset that is greater than the backup offset location;
   copying the data found on the source volume at the first offset to a snapshot space;
   after copying the data, writing the first data element to the source volume at the first offset;
   maintaining an association between a source volume offset of the copied source data blocks with a snapshot offset location indicating the location of the copied data in the snapshot space, wherein the associations are maintained in a search tree having a plurality of key/value pair nodes, where the key represents the source volume offset and the value represents the snapshot offset location;
   receiving a second write request to write a second data element to the source volume at a second offset that is smaller than the backup offset location; and
   writing the second data element to the source volume at the second offset without first copying the data found on the source volume at the second offset to the snapshot space.

2. The method of claim 1, wherein the step of sequentially performing the block level backup is performed by a backup software process and wherein the steps of writing the data elements to the source volume is performed by a snapshot driver that intercepts write requests to the source volume.

3. The method of claim 2, wherein the backup software process periodically communicates a value of the backup offset location to the snapshot driver.

4. The method of claim 3, wherein the snapshot driver stores the value of the received backup offset location and uses the value to determine whether the offsets of write requests are smaller than the backup offset location.

5. The method of claim 3, wherein the backup software communicates the value of the backup offset location each time after a predetermined number of blocks are backed up from the source volume.

6. The method of claim 1, wherein the snapshot space comprises a plurality of snapshot data files maintained by a file system.

7. The method of claim 6, wherein data in the snapshot space is maintained in a plurality of snapshot data files, wherein a particular snapshot data file is selected to receive a particular source data block based upon a relationship between a source offset of for particular source data block and the number of blocks per snapshot data file.

8. The method of claim 7, further comprising:
   periodically deleting snapshot data files in the snapshot space by analyzing the backup offset location based upon the relationship between the source offset for the particular source data block and the number of blocks per snapshot, wherein the deleted snapshot data files contain only data from the source volume that has already been backed up by the block-level backup.

9. The method of claim 1, wherein the snapshot space is maintained on a dedicated device, and further comprising:

copying a plurality of source data blocks on the source volume to the snapshot space, wherein the snapshot space maintains an association between a source volume offset of the copied source data blocks and a snapshot offset where the data blocks are copied;

when the snapshot space is full and additional source data is to be copied to the snapshot space, performing the following:

identifying a first snapshot offset location of copied data that has already been backed up by the block-level backup, and copying the additional source data to the snapshot space at the first snapshot offset location.

10. A method for performing copy-on-write snapshot management during a block-level backup of a source volume comprising:

establishing a snapshot of data found on the source volume;

sequentially performing the block-level backup of the snapshot of the source volume while maintaining a backup offset location identifying a location in the snapshot currently being backed up;

copying a plurality of source data blocks on the source volume to a plurality of snapshot data files in a snapshot space maintained by a file system, wherein a particular snapshot data file is selected to receive a particular source data block based upon the source offset for the particular source data block and a predetermined number of source data blocks maintained per snapshot data file; and during the block-level backup, deleting snapshot data files in the snapshot space after comparing the backup offset location with offsets of blocks of data stored in the snapshot data files to determine whether any snapshot data files contain data which has already been backed up, wherein the deleted snapshot data files contain only data from the source volume that has already been backed up by the block-level backup, wherein the snapshot space is managed using a search tree having a plurality of key/value pair nodes, where the key represents the source offset for the source data blocks copied to the snapshot space and the value represents a snapshot offset indicating the location of the copied data in the snapshot space.

11. The method of claim 10, wherein each snapshot data file contains no more than a predetermined number of source data blocks, further wherein the relationship between the source offset for the particular source data block divided by the predetermined number of source data blocks determines the particular snapshot data file.

12. The method of claim 11, wherein the source data blocks are copied to the snapshot data files using an internal offset to the snapshot data files determined by a remainder value from the relationship between the source offset and the predetermined number of source data blocks.

13. The method of claim 11, further comprising the step of, after deleting the snapshot data files, trimming the search tree of nodes where a value of a deleted node points to a deleted snapshot data file.

14. The method of claim 11, wherein a correct snapshot data file during the block-level backup is determined based upon the relationship between the source offset and the predetermined number of source data blocks with the value of a first node.

15. A method for performing copy-on-write snapshot management during a block-level backup of a source volume comprising:

establishing a snapshot of data found on the source volume;

sequentially performing the block-level backup of the snapshot of the source volume while maintaining a backup offset location identifying a location in the snapshot currently being backed up;

copying a plurality of source data blocks on the source volume to a snapshot space maintained on a dedicated device, and managing an association between a source volume offset of the copied source data blocks with a snapshot offset location indicating the location of the copied data in the snapshot space; and when the snapshot space is full and additional source data is to be copied to the snapshot space, performing the following:

identifying a first snapshot offset location of copied data that has already been backed up by the block-level backup based on the backup offset location, and copying the additional source data to the snapshot space at the first snapshot offset location;

wherein the snapshot space is managed using a search tree having a plurality of key/value pair nodes, where the key represents the source offset for the source data blocks copied to the snapshot space and the value represents a snapshot offset indicating the location of the copied data in the snapshot space.

16. The method of claim 15, wherein the first snapshot offset location is determined by traversing the search tree backwards, to find a first node in which the first node key points to a source volume offset location of source data already copied by the block-level backup, wherein the first node value points to the first snapshot offset location.

17. The method of claim 16, further comprising receiving a first write request to write new data over existing data found at a first source volume offset location on the source volume, still further comprising copying the existing data to the first snapshot offset location, and still further comprising updating the first node key to the first source volume offset location.

18. The method of claim 16, wherein blocks of copied data are not reused unless a write request is received to write new data over existing data on the source volume and the snapshot space is already full.

* * * * *